United States Patent
Evanitsky et al.

(10) Patent No.: US 8,473,454 B2
(45) Date of Patent: *Jun. 25, 2013

(54) SYSTEM AND METHOD OF ON-DEMAND DOCUMENT PROCESSING

(75) Inventors: Eugene Stephen Evanitsky, Pittsford, NY (US); John A. Moore, Rochester, NY (US); Matthew Dylan Coene, Ontario, NY (US); Steve Schlonski, Webster, NY (US); Wilma Wandersleben Chlebove, Honeoye Falls, NY (US)

(73) Assignee: Xerox Corporation, Norwalk, CT (US)

( * ) Notice: Subject to any disclaimer, the term of this patent is extended or adjusted under 35 U.S.C. 154(b) by 429 days.

This patent is subject to a terminal disclaimer.

(21) Appl. No.: 12/401,135

(22) Filed: Mar. 10, 2009

(65) Prior Publication Data

US 2010/0235305 A1  Sep. 16, 2010

(51) Int. Cl.
 *G06F 17/30* (2006.01)

(52) U.S. Cl.
 USPC .......................................................... 707/608

(58) Field of Classification Search
 None
 See application file for complete search history.

(56) References Cited

U.S. PATENT DOCUMENTS

| | | | |
|---|---|---|---|
| 4,965,763 A | 10/1990 | Zamora | |
| 6,043,819 A | 3/2000 | LeBrun et al. | |
| 7,673,340 B1 * | 3/2010 | Cohen et al. | 726/22 |
| 7,945,497 B2 * | 5/2011 | Kenefick et al. | 705/35 |
| 2002/0067497 A1 | 6/2002 | Thieret et al. | |
| 2005/0120300 A1 * | 6/2005 | Schwager et al. | 715/513 |
| 2005/0288965 A1 * | 12/2005 | Van Eaton et al. | 705/2 |
| 2006/0005139 A1 * | 1/2006 | Comaniciu et al. | 715/760 |
| 2007/0168219 A1 * | 7/2007 | Kunnes | 705/2 |
| 2007/0282632 A1 * | 12/2007 | Sachs | 705/3 |
| 2008/0082352 A1 * | 4/2008 | Schmidtler et al. | 705/1 |
| 2008/0301120 A1 | 12/2008 | Zhu et al. | |
| 2009/0024637 A1 | 1/2009 | Krishna et al. | |
| 2009/0070380 A1 | 3/2009 | Schwager et al. | |
| 2009/0112733 A1 * | 4/2009 | Horowitz | 705/27 |
| 2009/0220153 A1 | 9/2009 | Hall et al. | |
| 2010/0235369 A1 | 9/2010 | Evanitsky | |

* cited by examiner

*Primary Examiner* — Bai D. Vu
(74) *Attorney, Agent, or Firm* — Fay Sharpe LLP (57) ABSTRACT

A document processing method includes receiving, at a server with a network interface, electronic documents from a user. The server includes a software application adapted to recognize a class of electronic documents to which the electronic documents belong. The method also includes processing the electronic documents received from the user to extract data therefrom based on a recognition that the electronic documents belong to the class of electronic documents. The extracted data corresponds to a service being provided to the user. The method also includes automatically mapping the extracted data from the processed electronic documents to a data repository on the server. The data repository is accessible by the user through the network interface. The method also includes electronically generating output data based on the mapped data from the data repository to the user. The output data corresponds to the service being provided to the user.

17 Claims, 5 Drawing Sheets

SYSTEM AND METHOD OF ON-DEMAND DOCUMENT PROCESSING

BACKGROUND

1. Technical Field

The present disclosure relates to document processing, and, in particular, to a scaleable integration framework for processing electronic documents.

2. Description of Related Art

Document processing, for most entities, is an expensive and time consuming process because of the need for customization, dedicated resources, and long sales cycles. Currently-used systems typically work well for large entities, however, small to medium sized entities also have a need for document processing systems. Many of the tools required to process and manage digital information are costly and require specific expertise for effective use. Systems to store and transfer data securely are also costly to own and are often complicated to use. Currently, there are a variety of companies that offer small business software applications, provide related IT support or ISP, provide payroll services, and provide legal services. Still, other services provide systems to store, share, and access documents, however, these services do not provide for a system that automatically classifies documents and/or extracts metadata therefrom. Nor do these services provide a system that processes specific document types that can be recognized and from which data can be extracted and mapped to a data repository.

SUMMARY

In an embodiment of the present disclosure, a document processing method includes receiving, at a server with a network interface, electronic documents from a user. The server includes a software application adapted to recognize a class of electronic documents to which the electronic documents belong. The method also includes processing the electronic documents received from the user to extract data therefrom based on a recognition that the electronic documents belong to the class of electronic documents. The extracted data corresponds to a service being provided to the user. The method also includes automatically mapping the extracted data from the processed electronic documents to a data repository on the server. The data repository is accessible by the user through the network interface. The method also includes electronically generating output data based on the mapped data from the data repository to the user. The output data corresponds to the service being provided to the user.

According to another embodiment of the present disclosure, a scaleable integration framework for processing electronic documents to provide business services includes a document services grid accessible by a user through a web-based interface portal and adapted to receive electronic documents. The document services grid includes a hosted server including a software application adapted to process an electronic document received from the user to extract data therefrom based on a recognition of a class of the processed electronic document. The extracted data corresponds to a service being provided to the user. The document services grid also includes a data repository operating on the hosted server. The data repository is configured to store extracted data mapped from the processed electronic document. The document services grid is configured to generate output data to the user based on the mapped data. The output data corresponds to the service being provided to the user.

According to another embodiment of the present disclosure, a document processing method includes receiving, at a server with a network interface, electronic documents from a user. The server includes a software application adapted to recognize a class of electronic documents to which the electronic documents belong. The method also includes processing the electronic documents received from the user to extract data therefrom based on a recognition that the electronic documents belong to the class of electronic documents. The extracted data corresponds to a service being provided to the user. The method also includes automatically mapping the extracted data from the processed electronic documents to a data repository on the server. The data repository is accessible by the user through the network interface. The method also includes monitoring a behavior of the user based on access to the data mapped to the data repository and electronically generating output data from the data repository based on the monitored behavior of the user. The output data corresponds to the service being provided to the user.

BRIEF DESCRIPTION OF THE DRAWINGS

These and other advantages will become more apparent from the following detailed description of the various embodiments of the present disclosure with reference to the drawings wherein.

DETAILED DESCRIPTION

Embodiments of the presently disclosed scaleable integration framework will now be described in detail with reference to the drawings in which like reference numerals designate identical or corresponding elements in each of the several views.

The present disclosure relates to an online service, and, in particular, to a system and method for creating specific document intensive services for well understood, repeatable processes used in specific businesses. The system utilizes basic internet technologies, readily available image capture devices, and trained document processing tools that utilize industry specific knowledge to provide scaleable services to businesses in an intuitive, low cost of entry/exit model that can be provided to meet a customer's maturity level. The scalability of the services that may be provided applies to the various sizes of customer to which the system may provide services. For example, services may be provided both to large enterprises as well as small businesses. With this purpose in mind, the system provides a document services grid ("DSG") including a hosted server accessible over the Internet through an intuitive web-based interface or customer web portal to combine document processing capabilities (e.g., categorization, extraction, etc.) with continuous learning capability (e.g., by example, training, and continuous updating). The DSG utilizes trained document processing software to receive and process scanned documents of a specific type (e.g., from a readily available image capture device) via the internet (or web-based interface) such that data can be extracted from the scanned documents and subsequently recognized or classified and mapped to a data repository on the hosted server. Customers have an opportunity to verify, and if necessary, correct the resulting data extraction and/or document classification and store the verified and/or corrected results in the data repository on the hosted server. In this manner, the DSG is self-learning in that each successful classification and extraction related to a processed document enables the system to accumulate a so-called "knowledge-base" of documents specific to the customer's business and/or preferences. The DSG may be pre-configured with industry-specific and/or customer-specific rules that dictate the data extracted from documents. The DSG utilizes the continuously growing knowledge-base to improve classification accuracy with every document processed and further, grow the maturity level of the service for both the DSG and the customer, as will be discussed in further detail below.

The DSG is adapted to monitor and analyze its own classification success rate as well as the behavior of customers. In this way, the DSG intelligently and dynamically provides recommendations to the customer related to modifying and improving the customer's work practices. Specifically, the DSG monitors for process maturity indicators such as, for example, multiple users looking at the same document, multiple documents that are similar, and common metadata across a set of documents. As the customer moves up the maturity curve, the DSG suggests process simplifications and/or improved ways of doing business to achieve greater process maturity. As the DSG processes more documents, the tools utilized by the DSG also improve to increase the DSG maturity level as well. Further, the DSG monitors and analyzes usage and prompts the service manager or administrator to invest in more capacity or greater automation for heavily used services.

In use, the customer uses a standard web browser to connect to the Internet (e.g., using a PC, a cell phone, handheld device, etc.). Using a device to digitize paper documents (e.g., a standalone scanner or a scanner as part of a multi-function device, a cell phone camera, etc.), the customer digitizes documents for uploading, via the web browser, to the DSG. Customers may also upload electronically created documents. The DSG hosts client software that is utilized through downloadable plug-ins to provide iconic access to the data repository on the hosted server. The customer may utilize one or more icons and/or shortcuts on the desktop of their PC or the interface of a computing device to upload documents (e.g., via drag and drop), review uploaded documents processed by the DSG for purposes of verification and/or correction, and receive notifications, discussed in further detail below. Further, an icon and/or shortcut on the desktop or interface is provided to facilitate access to the data repository on the hosted server to view their stored data. The view of the data repository for a given customer may be dictated by customer preference and/or the specific business and/or industry (e.g., legal, accounting, customer service, etc.) in which the customer is involved. As referenced herein, the term "customer" may refer to one or more users of the service operating under a common subscription to the service. That is, a customer may be one or more users working or owning the same business for which the service is being provided (e.g., partners, owners, employees, etc.).

Figure 1:
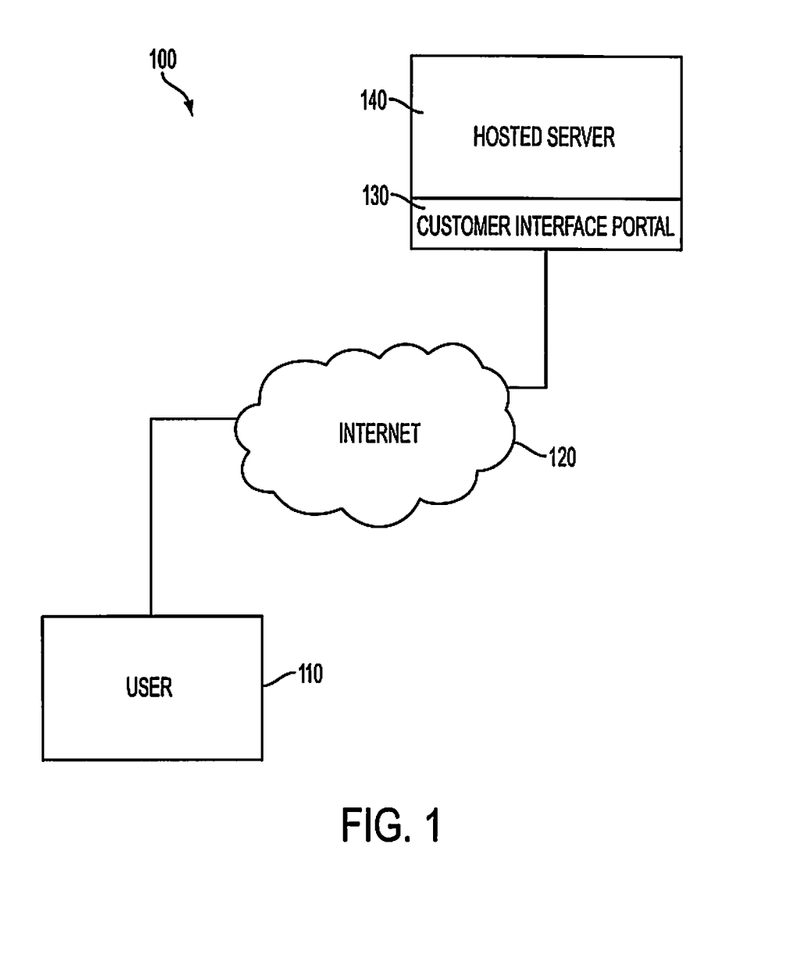
FIG. 1 is a block diagram of a general framework for implementing a scaleable web-based business service using document processing in accordance with the present disclosure.

Referring now to FIG. 1, a scaleable business services system 100 is shown and generally includes a hosted server 140 accessible by a user 110 over the Internet 120 through a customer interface portal or scaleable business services website 130 ("SBS website 130"). The SBS website 130 may be, for example, an Internet-based hosted service (e.g., Web 2.0®) accessed over the Internet 120 via a customer web portal. Using a standard web browser, the user 110 may connect to the Internet 120 to access the data repository on the hosted server 140 through the SBS website 130. With this purpose in mind, the user 110 may utilize a PC, a cell phone, and/or any suitable web-enabled handheld device to connect to the SBS website 130. Customer software requirements are minimal in that plug-ins may be used to provide iconic access to the hosted server 140 through the SBS website 130.

Utilizing a suitable scanning device (not explicitly shown) such as, for example, a scanner, a digital camera, or a cell phone camera, the customer or user 110 digitizes documents for uploading to a data repository on the hosted server 140. Suitable security mechanisms such as encryption (e.g., secure sockets layer or transport layer security) may be used to secure a connection between the user 110 and the hosted server 140. In this manner, any documents or data communicated to or from the hosted server 140 may be encrypted to ensure that customer information is kept private. Documents may include, for example without limitation, electronic documents, image files from a multi-function device ("MFD"), and image files from a camera phone or digital camera. In embodiments, the DSG is adapted to receive image files transmitted from an MFD or cell phone camera directly. The hosted server 140 may be any suitable network device running any known operating system and configured to communicate data over a network (e.g., the Internet 120). In other words, a computer, switch, router, gateway, network bridge, proxy device or other network device that is programmed or otherwise configured to operate as explained herein is considered an embodiment of this disclosure.

Figure 2:
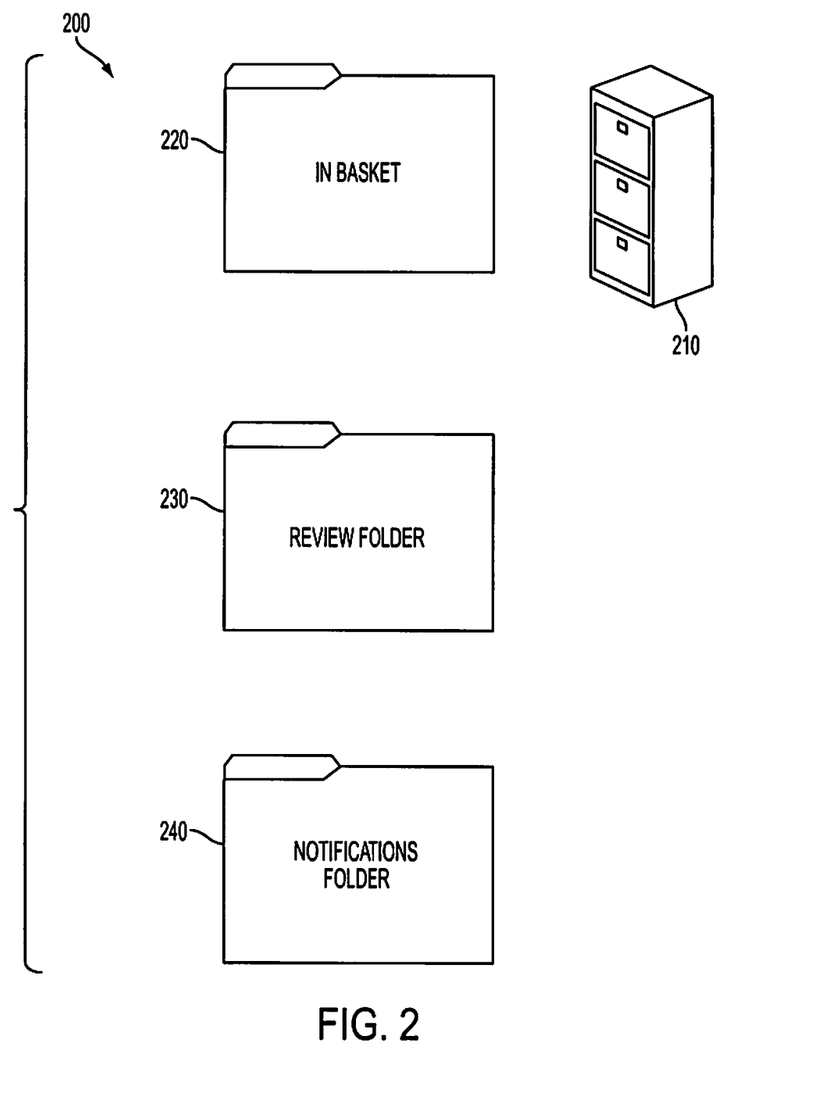
FIG. 2 is a sample view of a user interface for use with the web-based business service in accordance with embodiments of the present disclosure.

With reference to FIG. 2, a sample view or interface 200 of a user's display device (e.g., hand held device, intelligent phone, PC, etc.) is shown to illustrate how the user 110 may communicate and/or interact with the DSG, as described in further detail below. Users 110 transfer (e.g., drag and drop) their documents and/or electronic images into the appropriate folder or shortcut on their interface 200. For example, in the illustrated embodiment, customers are provided with one or more folders and/or shortcuts. Customers have a customized view of the data repository based on their preferences, specific business and/or industry, or the service to which the customer has subscribed.

With returning reference to the interface 200 shown in FIG. 2, the user 110 may transfer documents (e.g., utilizing drag and drop) to an in-basket 220 whereupon the transferred documents are automatically and securely transmitted to the data repository on the hosted server 140. Utilizing a suitable software application, the hosted server 140 automatically classifies the transferred document(s) and extracts essential metadata therefrom. For example, the host server 140 may employ a suitable processing software application having optical character recognition ("OCR") functionality to process uploaded files and extract key data therefrom for storage in the data repository. Typically, software applications utilized to seek out data from unstructured or semi-structured documents require "training" with sample sets of documents. This training enables the processing software application to recognize key data (e.g., text, data glyphs, bar codes, Optical Mark Recognition, logos, connected components, etc.) on a given document to classify the document and, based on this classification, seek out and extract business-specific data therefrom. Typically, business documents are semi-structured and include key words and information that the processing software application may be trained to detect and extract. The processing software application is "trained" with sample sets of documents and documents related to an industry or business that is specific to the customer, thereby enabling the classification of documents and extraction of business-specific data therefrom. That is, the document training and rules for extracting data therefrom may be specific to each customer. In embodiments, the processing software application may be trained with semi-structured documents that are well-known in a given industry to limit the complexity and costs associated with automating the DSG. In the event that the DSG fails to classify a document or wrongly classifies a document, the customer may correct the results, accordingly. Likewise, the customer may verify that documents have been correctly classified. With each document successfully classified, verified, and/or corrected, the accuracy of the processing software application improves. Further, the DSG is provided with knowledge and/or regulatory compliance for specific industries and is able to detect and tag documents accordingly.

Opening or selecting the in-basket 220 reveals information such as a listing of documents currently being classified and document status (e.g., "finished", "review", etc.). Opening or selecting a review folder 230 on the interface 200 allows the user to review documents classified by the DSG and select specific documents to view information such as the document image, the document classification, and any metadata extracted from the document(s). The customer may verify any of the above-listed information and/or correct any errors made by the DSG during processing. In this manner, the DSG is re-trained with verified and/or corrected information relating to specific documents and/or classifications of documents. For example, if the processing software application is unable to extract data from a document and/or classify the document with certainty, the customer is alerted through the review folder 230. The customer may verify the classification of the document and/or the data from the document and, further, make corresponding modifications. Further, the DSG is self-learning in that each successful classification and extraction related to a processed document enables the DSG to accumulate a so-called "knowledge-base" of documents specific to the customer's preferences and/or business. In this way, the DSG learns with each document classified, whether successfully or unsuccessfully and subsequently verified and/or modified. That is, once a document or document type has been verified, subsequent documents of the same or substantially similar type may not require verification by the customer thereafter. Classified and verified documents are stored in the data repository of the hosted server 140.

Based on key data (e.g., business-specific data, industry-specific data, etc,) extracted from classified and/or verified documents, the DSG is adapted to automatically generate customer-specific service offers, service or business suggestions (e.g., computing and/or connectivity upgrade suggestions based on business volume), document summarizations, document redacting, notifications, events, progress, offers, and the like. The customer may receive any of the above discussed customer-specific information (e.g., via email or any suitable method) on demand and/or periodically in accordance with the preference of the customer. A suitable software application (e.g., content management software) operating on the host server 140 is adapted to process digital images. The content management software may include, for example, a services-specific application adapted to provide document or information related technologies such as image clean up, data extraction (e.g., optical character recognition), image classification, image classification vs. text classification, amount of color usage, and data mining. Further, the services-specific application is adapted to provide industry-specific document category sets, workflows and routings, regulatory rules, and service links to customize the service according to industry and/or application. The content management software may also include, for example, a customer-specific application adapted to process and store images and/or data uploaded by the user 110 such as, image files, metadata related to the image files, unique classification rules specific to a customer, customizable permissions, and/or notifications of events and/or triggers related to data stored for a customer.

The customer may view their documents stored in the data repository of the host server 140 by selecting a repository icon 210 on their interface 200 to access the data repository via the SBS website 130, as will be discussed in further detail below with reference to FIG. 3. In this manner, the customer is able to perform various tasks such as, for example, searching for documents, producing and/or subscribing to reports, viewing image files, and viewing metadata related to documents. Further, the customer is able to arrange for notifications related to their documents and/or the industry in which the customer's business operates. A notifications folder 240 on the customer interface 200 may be selected to view notifications to which the customer has subscribed and/or produced. Customer notifications may include, for example, reminders, compliance information, reports, work process information, alerts from user to user regarding responsibility for work flow steps, information updates (e.g., from an RSS feed or a Mashup), and the like.

Through the SBS website 130, the customer may learn about available services, test available services, and register for available services (e.g., through use of a wizard). For example, the SBS website 130 may include website links to tools or services useful for the customer's business and/or forms and information websites (e.g., patents, legal advice, tax forms, etc.). Further, the customer may select desired services, identify document classifications utilizing samples to train the DSG, identify desired notifications, run sample sets and check results, select reports to view or download, etc. The SBS website 130 also provides hints and/or tips for correcting misclassified documents or misinterpreted data.

Customers may subscribe to any one or more industry-specific and/or business-specific services offered by the DSG under various payment or subscription fee models. For example, customers may only be required to pay for the services they use and not be obligated to a subscription contract. Alternatively, the customer may be required to pay a one-time subscription fee and/or a periodic subscription fee. Customers that wish to cancel a service to which they have subscribed, are given a computer-readable medium (e.g., CD, DVD) having stored thereon the customer's documents and/or data including a tool to view and export the data.

Figure 3:
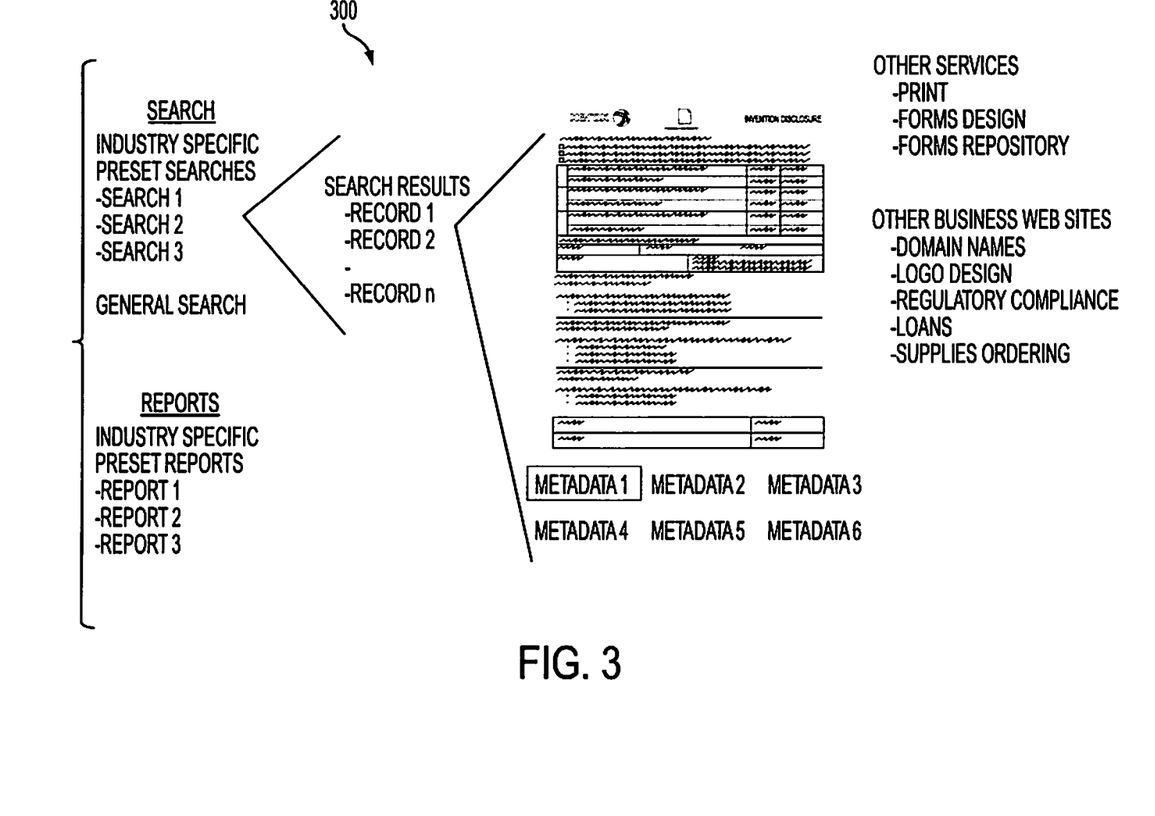
FIG. 3 is a sample customized user view of a web-based interface of the business service in accordance with embodiments of the present disclosure.

FIG. 3 shows a sample customized user view on the SBS website 130 to illustrate how a customer may search for and view processed documents stored on the data repository. The view, referenced generally as 300, is customer-specific in accordance with the customer's business, industry, and/or preferences. Upon selection of the repository icon 210 (FIG. 2), the user 110 connects to the SBS website 130 via the Internet 120 to access the repository on the host server 140. In use, the user 110 is authenticated utilizing a suitable software application (e.g., user name and password) before gaining access to their documents and/or their custom view 300. As shown in FIG. 3 by way of example, the custom view 300 lists reports available to the user 110, search results, customer services (e.g., document printing, document form design, document form repository, etc.), and website links to useful business services related to the customer's business and/or industry (e.g., domain names, logo design, regulatory compliance, loans, supplies ordering, etc.). Other customer-specific information may be available to the user 110 and the above list should not be construed as exhaustive.

Figure 4:
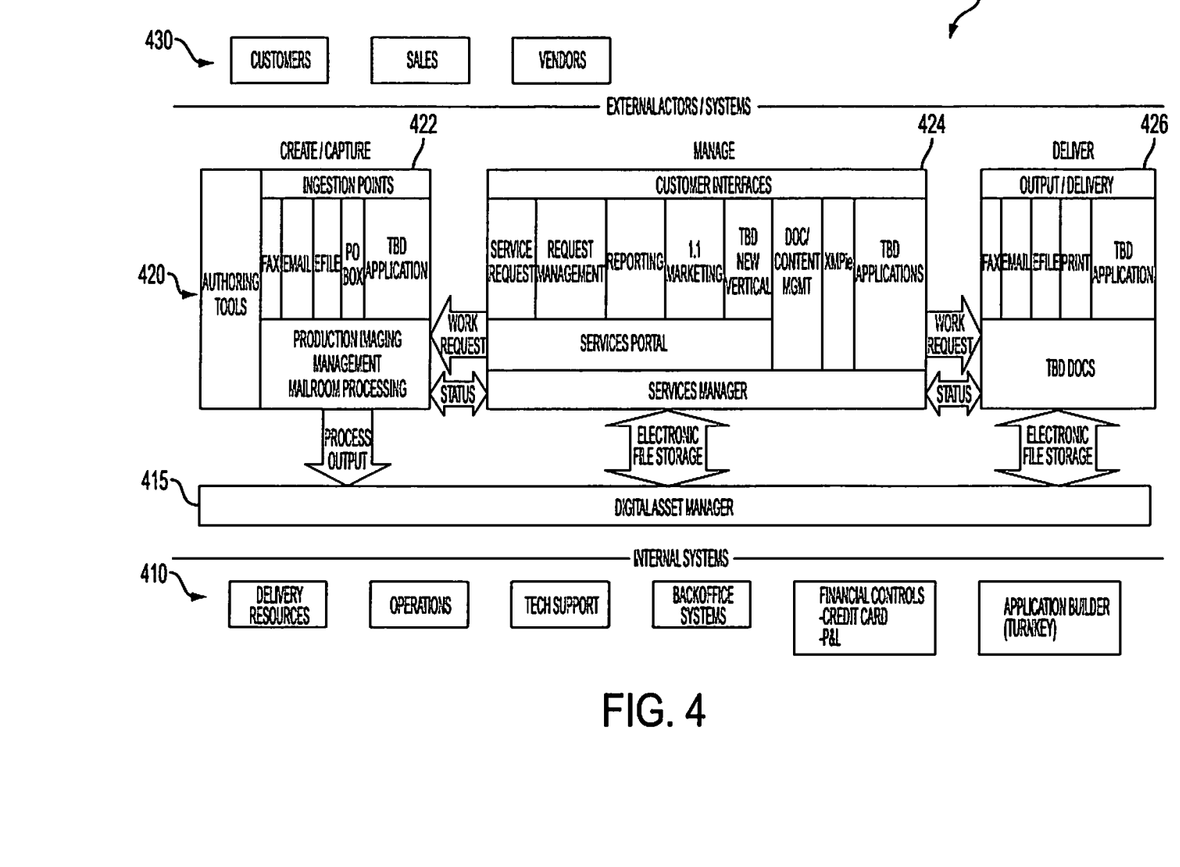
FIG. 4 is a flow diagram illustrating a high level framework for a document services grid according to embodiments of the present disclosure.

With reference to FIG. 4, a flow diagram 400 depicts a modular system architecture for services hosted by the DSG according to an embodiment of the present disclosure. Generally, the architecture includes internal systems 410 (e.g., delivery resources, operations, tech support, back office systems, financial controls, application builder, etc.), external actors and/or systems 430 (e.g., customers, sales, vendors, etc.), and web services 420, including three distinct document process phases, namely, create/capture 422, manage 422, and output delivery 426. From a bird's eye view, the flow diagram 400 is structured vertically through each layer, depending on what is needed for each pre-configured service. Within each phase is shown possible physical infrastructures utilized (e.g., MFD, Fax, etc.) and/or software platforms utilized (e.g., XPIM, XSP, XSM). A Digital Asset Manager layer 415 handles process output and electronic file storage, as well as tie-ins to the existing internal systems 410.

Figure 5:
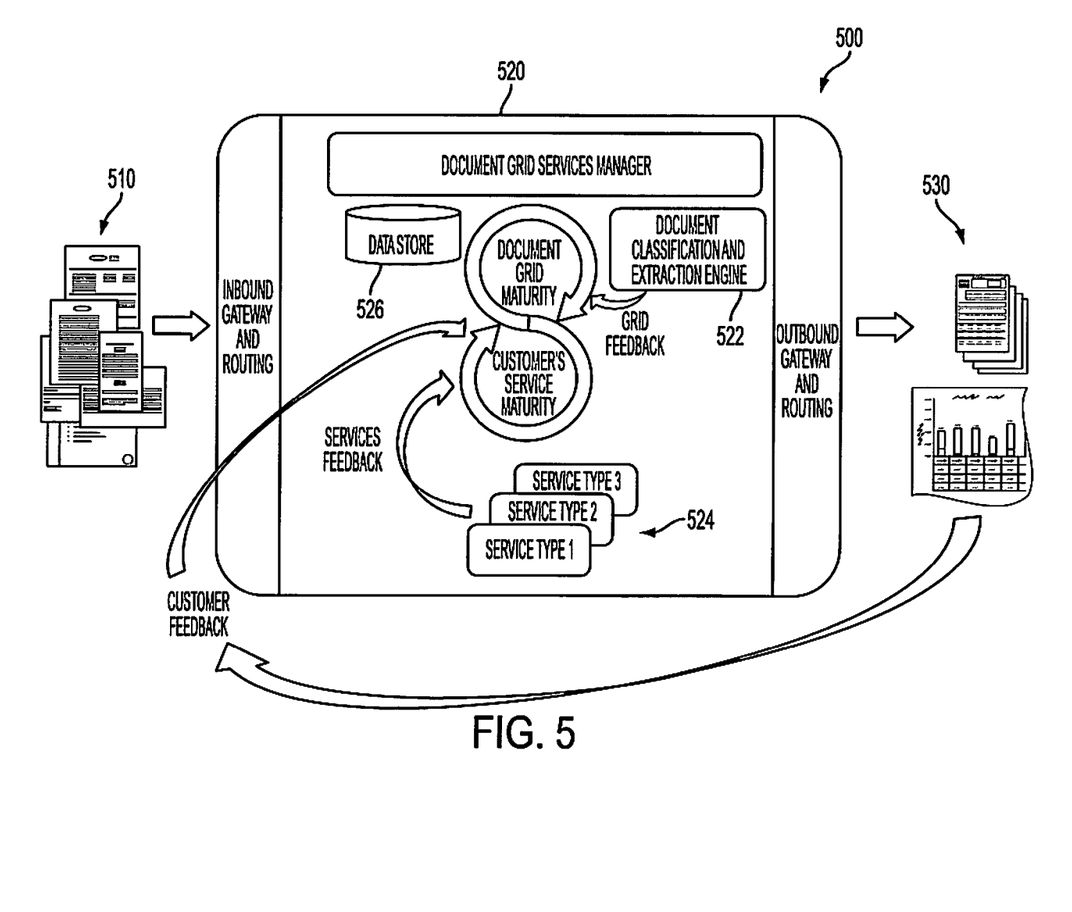
FIG. 5 shows the system architecture of a document services grid in accordance with embodiments of the present disclosure.

FIG. 5 illustrates system architecture of the DSG in accordance with embodiments of the present disclosure and is referenced generally as 500. The DSG system 500 includes a DSG manager 520 operating, for example, on the host server 140 (FIG. 1). The DSG manager 520 is adapted to receive customer documents 510 through inbound gateways and/or routing (e.g., eMail, Fax, MFD, Web Folder, etc.). Customer documents 510 may be stored in a storage device or repository 526. Customer documents 510 may be accepted by the DSG manager 520 in any order and in any one of a variety of suitable file or document formats. The DSG system 500 allows for ad-hoc document input using intuitive input and output gateways to the DSG manager 520 such as, for example without limitation, drag-n-drop, email, fax, and network scan. Further, the DSG system 500 provides a document classification and extraction engine 522 to extract and process key data from documents utilizing specialized or trained document classification and extraction technologies. Based upon extracted data, the DSG manager 520 generates business data output 530 targeted at specific business services using outbound gateways and routing. In this manner, the DSG manager 520 performs, rather than the customer, processing and labor-intensive work related to documents and the data extracted therefrom. Further, the DSG manager 520 generates archival versions of original input documents stored in the repository 526. In embodiments, the DSG system 500 may store and/or display documents in a common, normalized format (e.g., PDF).

The system 500 is built on so-called "dual-mode dynamic maturity model" engine. More specifically, one mode of the system 500 allows individual services 524 to be managed or offered at different maturity levels concurrently. Another mode of the system 500 allows the maturity of the system as a whole to be managed independently. The system 500 as a whole offers multiple feedback loops (e.g., services feedback from individual services 524, grid feedback from the document classification and extraction engine 522, etc.) and refinement tools to grow the maturity of the individual services offered by the DSG system 500 as well as the DSG system 500 as a whole. This configuration allows the customer to improve their return on investment and enables the administrator of the DSG system 500 to improve efficiency of delivery to effectively provide the complete lifecycle for document processing and related services.

The DSG framework 500 may be embodied as a grid computing system that combines the network, storage, computing, and software elements to provide centralized processing power to the customer and, moreover, to achieve a scaleable solution. The customer connects to and utilizes the centralized processing power of the grid computing system to execute specific tasks related to the customer's business and/or industry in accordance with a service subscription.

In embodiments, a variety of authentication mechanisms (e.g., username, password, etc.) may be employed to prevent unauthorized access to the DSG. In this scenario, authenticating information such as, for example, a username and password is required to access the hosted server 140. In embodiments, the data repository may store documents and related data as digital image files (e.g., JPG, GIF, PNG, TIF, etc.) or as PDF files in the repository to provide archive protection. In this manner, the DSG may offer a guarantee that uploaded documents will not be altered once received and processed by the hosted server 140.

It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A document processing method, comprising:

receiving, at a server with a network interface, at least one electronic document from a user related to one of an industry and business that is specific to the user, the server including a software application adapted to recognize a class of electronic documents to which the at least one electronic document belongs and wherein the user is a business entity;

processing the at least one electronic document received from the user to extract business-specific data from the at least one electronic document based on a recognition that the at least one electronic document belongs to the class of electronic documents, the extracted data corresponding to a service being provided to the user;

automatically mapping the extracted data from the at least one processed electronic document to a data repository on the server, the data repository being accessible by the user through the network interface;

electronically generating output data based on the mapped data from the data repository to the user, wherein the output data corresponds to a service suggestion being provided to the user, the output data including a recommendation to the user related to modifying and improving a work practice of the user, the recommendation including a process simplification and/or an improved way of the user doing business as a business entity;

providing the user with access to the mapped data on the data repository;

receiving one of a verification and a correction of the mapped data;

training the software application based on one of the verification and the correction; and, automatically classifying a subsequently processed electronic document that is substantially similar to a previously processed electronic document from which mapped data has been one of verified and corrected to train the software application in accordance with the class of the previously processed electronic document.

2. The document processing method according to claim 1, further comprising: training the software application to recognize the class of the electronic document, wherein the training is based on the service being provided to the user.

3. The document processing method according to claim 1, further comprising: monitoring a behavior of the user based on access to the mapped data on the data repository; and generating the output data based on the monitored behavior of the user.

4. The document processing method according to claim 3, wherein the monitored behavior of the user corresponds to at least one of a frequency with which a user accesses particular mapped data, a processing of a plurality of electronic documents that are substantially similar, and a mapping of common data from a plurality of processed electronic documents to the data repository.

5. The document processing method according to claim 3, further comprising: detecting a maturity level of the monitored behavior, wherein the output data generated is based on the detected maturity level.

6. The document processing method according to claim 5, wherein the output data includes a notification to the user, the notification corresponding to at least one of the monitored behavior of the user, the detected maturity level of the monitored behavior, and the service being provided to the user.

7. The document processing method according to claim 5, wherein a maturity level of the output data progresses in proportion to the maturity level of the monitored behavior.

8. The document processing method according to claim 1, wherein the service being provided to the user is based on at least one of a type of business corresponding to the user and a type of industry corresponding to the type of business.

9. The document processing method according to claim 1, wherein the user is provided with at least one desktop icon to facilitate access to the data repository through the network interface via a remote computing device.

10. A scaleable integration framework for processing electronic documents to provide business services, comprising:
a document services grid accessible by a user through a web-based interface portal and adapted to receive electronic documents related to one of an industry and business that is specific to a user, wherein the user is a business entity, the document services grid comprising:
a hosted server including a software application adapted to process at least one electronic document received from the user to extract business-specific data based on a recognition of a class of the at least one processed electronic document, the extracted data corresponding to a service being provided to the user; and
a data repository operating on the hosted server and configured to store extracted data mapped from the at least one processed electronic document, wherein the document services grid is configured to automatically generate output data to the user based on the mapped data, the output data including a recommendation to the user related to modifying and improving a work practice of the user, the recommendation including a process simplification and/or an improved way of the user doing business as a business entity, wherein the framework receives one of a user-provided verification and correction of the mapped data to train the software application based on one of the verification and the correction, the training is adapted for subsequently processing an electronic document that is substantially similar to a previously processed electronic document from which mapped data has been one of verified and corrected to train the software application, the subsequently processed electronic document is automatically classified in accordance with the class of the previously processed electronic document.

11. A scaleable integration framework according to claim 10, wherein the data repository is remotely accessible by the user through the web-based interface portal.

12. A scaleable integration framework according to claim 10, wherein the user is provided with at least one desktop icon to facilitate access to the data repository through the web-based interface portal via a remote computing device.

13. A method for utilizing a scaleable integration framework to provide business services, comprising:
receiving, at a server with a network interface, at least one electronic document from a user, the user being a business entity, the document being related to an industry or business that is specific to the user, the server including a software application adapted to recognize a class of an electronic document to which the at least one electronic document belongs;
processing the at least one electronic document received from the user to extract business or industry data from the at least one electronic document based on a recognition that the class of the at least one processed electronic document belongs to the class of electronic documents, the extracted data corresponding to a service being provided to the user;
automatically mapping extracted data from the at least one processed electronic document to a data repository on the hosted server, the data repository being accessible by the user through the network interface;
monitoring a behavior of the user based on access to the data mapped to the data repository; and
electronically generating output data from the data repository based on the monitored behavior of the user, wherein the output data corresponds to a service suggestion being provided to the user, the service suggestion including at least one of a process simplification and improved way of doing business for modifying and improving an industry or business work practice of the user as a business entity;
providing the user with access to the mapped data for receiving one of a verification and a correction to train the software application based on one of the verification and the correction; and,
automatically classifying a subsequently processed electronic document that is substantially similar to a previously processed electronic document from which mapped data has been one of verified and corrected to train the software application in accordance with the class of the previously processed electronic document.

14. The method according to claim 13, further comprising: detecting a maturity level of the monitored behavior of the user; and electronically generating output data based on a progression of the detected maturity level.

15. The method according to claim 14, further comprising: generating a notification to the user of the service, the notification corresponding to at least one of the monitored behaviors and the progression of the detected maturity level.

16. The method according to claim 14, wherein a maturity level of the generated output data progresses in proportion to the maturity level of the monitored behavior.

17. The method according to claim 13, further comprising: providing the user with at least one desktop icon to facilitate access to the data repository through the network interface via a remote computing device.

* * * * *